United States Patent
Popper et al.

(10) Patent No.: US 7,382,839 B2
(45) Date of Patent: *Jun. 3, 2008

(54) INGRESS NOISE REDUCTION IN A DIGITAL RECEIVER

(75) Inventors: Ambroise Popper, Paris (FR); Fabien Buda, Paris (FR); Hikmet Sari, Charenton (FR)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/460,287

(22) Filed: Jul. 27, 2006

(65) Prior Publication Data

US 2006/0256898 A1    Nov. 16, 2006

Related U.S. Application Data (63) Continuation of application No. 10/120,968, filed on Apr. 10, 2002, now Pat. No. 7,106,815.

(30) Foreign Application Priority Data

Apr. 12, 2001    (EP)    ................... 01400956

(51) Int. Cl.
*H03D 1/04*    (2006.01)
(52) U.S. Cl. .................................................... 375/346
(58) Field of Classification Search ................ 375/219, 375/220, 221, 223, 229, 230, 231, 232, 233, 375/234, 235, 236, 346, 347, 348; 370/286, 370/288, 289, 290; 379/406.05; 708/330, 708/534
See application file for complete search history.

(56) References Cited

U.S. PATENT DOCUMENTS

| | | | |
|---|---|---|---|
| 4,000,369 A | 12/1976 | Paul et al. | |
| 5,148,486 A | 9/1992 | Kudoh | |
| 5,453,797 A | 9/1995 | Nicolas et al. | |
| 5,546,459 A | 8/1996 | Sih et al. | |
| 5,694,437 A * | 12/1997 | Yang et al. | 375/346 |
| 5,710,996 A | 1/1998 | Kajimoto et al. | |
| 5,717,717 A | 2/1998 | Yang et al. | |
| 5,995,567 A | 11/1999 | Coiffi et al. | |
| 6,188,722 B1 * | 2/2001 | Velez et al. | 375/233 |
| 6,240,133 B1 * | 5/2001 | Sommer et al. | 375/232 |
| 6,563,868 B1 * | 5/2003 | Zhang et al. | 375/232 |

(Continued)

OTHER PUBLICATIONS

G. Redaelli, et al., "Advanced Receiver to Dip Ingress Noise in HFC Return Channel," published in the conference proceedings of ISPACS 2000, 6 pages.

(Continued)

*Primary Examiner*—Sam K. Ahn
(74) *Attorney, Agent, or Firm*—Harrity Snyder, LLP (57) ABSTRACT

The invention provides a device for reducing ingress noise in a digital signal, comprising a noise predictor for predicting an amount of ingress noise in the digital signal based on past samples of the ingress noise, and a subtractor for subtracting the predicted amount of ingress noise from the digital signal. Channel distortion is compensated for by a noise-independent equalizer, such as a ZF equalizer, placed upstream of the noise predictor. The device may be incorporated, for example, in a cable modem termination system (CMTS) of an hybrid fiber/coax (HFC) network.

22 Claims, 6 Drawing Sheets

U.S. PATENT DOCUMENTS

| | | |
|---|---|---|
| 6,647,069 B1 | 11/2003 | Segal et al. |
| 6,647,070 B1 | 11/2003 | Shalvi et al. |
| 6,687,235 B1 | 2/2004 | Chu |
| 6,922,445 B1 | 7/2005 | Sampath et al. |
| 6,928,107 B1 | 8/2005 | Olafsson et al. |
| 6,934,345 B2 | 8/2005 | Chu et al. |

OTHER PUBLICATIONS

European Patent Office, European Search Report for European Application No. 01400956.7, Nov. 29, 2001.

C.A. Eldering et al, "CATV Return Path Characterization for Reliable Communications," IEEE Communications Magazine, IEEE Service Center, Piscataway, N.J., US, vol. 33, No. 8, Aug. 1, 1995, pp. 62-69, XP000525541, ISSN: 0163-6804.

* cited by examiner

INGRESS NOISE REDUCTION IN A DIGITAL RECEIVER

CROSS-REFERENCE TO RELATED APPLICATIONS

The application is a continuation of application No. 10/120,968 now U.S. Pat. No. 7,106,815, filed Apr. 10, 2002 and issued Sep. 12, 2006, which claims priority under 35 U.S.C. 119 based on European Patent Application No. 01400956.7 filed Apr. 12, 2001, both of which are incorporated by reference herein.

FIELD OF THE INVENTION

The present invention generally pertains to ingress noise in a digital receiver. According to a particular application of the present invention, the digital receiver is part of a head-end cable modem termination system (CMTS) in a hybrid fiber/coax (HFC) network.

DESCRIPTION OF THE PRIOR ART

HFC networks are bi-directional networks using both optical fibers and electrical broadband coaxial cables. By virtue of their limited cost, these networks are currently preferred over fully optical fiber to the home (FTTH) systems which are however technically superior.

Most of HFC networks are of the tree and branch type, and comprise cable modems (CMs), provided at the subscribers' premises, and a head-end, consisting of a CMTS and an interface unit for interfacing with service providers, such as Internet service providers. Typically, two types of communication paths are involved in HFC networks, namely downstream paths from the CMTS to the cable modems and upstream paths from the cable modems to the CMTS. One spectrum band is reserved for each of these paths. By way of example, according to the Data Over Cable Service Interface Specification (DOCSIS), the spectrum bands reserved for upstream and downstream communications respectively are 5-42 MHz and 50-750 MHz. The upstream spectrum band is divided into several channels which, in the DOCSIS standard, have a bandwidth comprised between 200 kHz and 3200 kHz.

Figure 1:
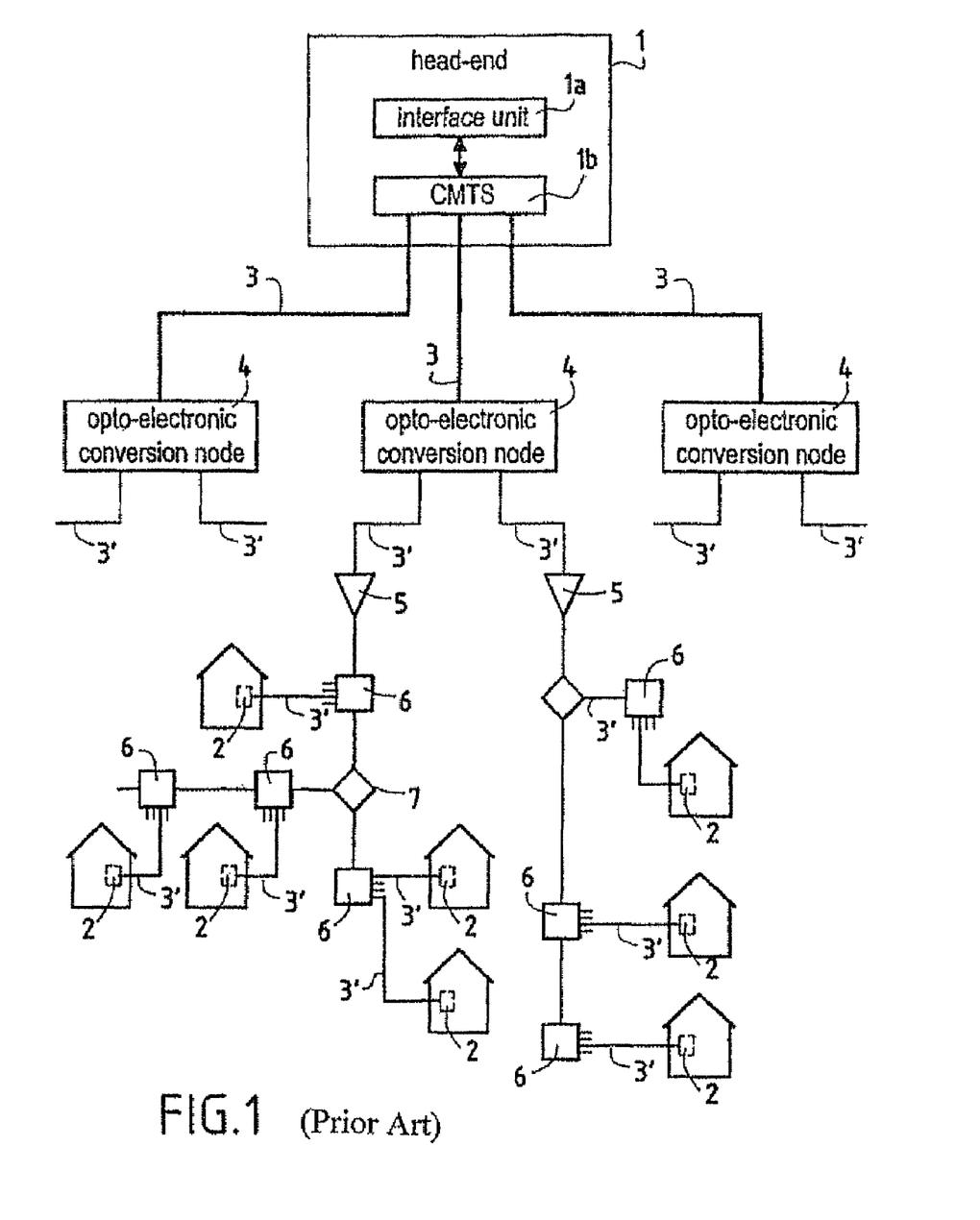
FIG. 1, already discussed, diagrammatically shows the overall structure of an HFC network.

FIG. 1 diagrammatically shows the overall structure of an HFC network. In FIG. 1, the head-end is designated by the reference numeral 1, and the interface unit and the CMTS which are included in the head-end 1 are referenced 1a and 1b, respectively. Reference numeral 2 represents the cable modems in the subscribers' premises. The CMTS 1b and the cable modems 2 are connected to each other through a set of communication links 3, 3', opto-electronic conversion nodes 4, bi-directional amplifiers 5, taps 6 and splitters/combiners 7. Generally, the communication links 3 connected to the CMTS 1 are in the form of optical fibers, whereas the other communication links 3', including those connected to the subscribers' cable modems 2, are constituted by electrical coaxial cables.

Upstream communications in an HFC network are usually based on a combined Frequency Division Multiple Access (FDMA)/Time Division Multiple Access (TDMA) scheme. Each cable modem is allocated a given frequency channel and time slots in which it may transmit data bursts to the CMTS.

Each data burst comprises a preamble and an information field containing useful information data. The preamble consists of a predetermined sequence of symbols which is known to the CMTS. The preamble of each data burst may be used, in particular, for equalization and synchronization purposes in the CMTS.

When a given cable modem starts transmitting towards the CMTS, it first sends initial data bursts, called ranging bursts. The information field of each ranging burst contains several parameters including an identification parameter for the cable modem. An authentication procedure is then performed between the CMTS and the cable modem. Once the cable modem has been clearly identified by the CMTS, the CMTS allocates specific time slots to the cable modem in which the cable modem will be allowed to send the traffic bursts. Each allocated time slot has a size adapted to allow the transmission of a corresponding traffic burst.

A known problem with HFC networks is that the channels reserved for the upstream communications are corrupted by ingress noise. Ingress noise is a narrow band interference caused by undesired external signals entering the network at weak points such as cable connectors at the subscribers' homes, ill-shielded network portions and coax junctions. Such external signals are often created by electrical equipment, in particular radio AM devices, in the vicinity of the network.

Ingress noise differs from the burst noise and impulse noise in that its characteristics are slowly variable. Its power may be quite strong, typically up to 10 dB below the carrier power. Its bandwidth is generally around 20 kHz.

Ingress noise is the main channel impairment in HFC networks, and transmission on a band where ingress noise is present either is impossible or suffers very severe degradations in terms of the bit error rate (BER). In the upstream communication paths, the noise originating from each subscriber is aggregated with the noise from other subscribers. Thus, even if the noise induced by each subscriber is small, the resulting noise at the CMTS will be very important.

Figure 2:
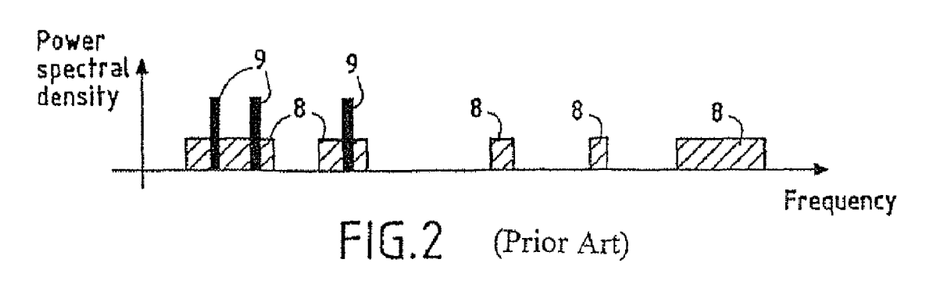
FIG. 2, already discussed, is a diagram showing an exemplary power spectral density of upstream channels in an HFC network.

FIG. 2 shows, as an example, an upstream communication spectrum band comprising five channels 8, two of which are corrupted with ingress noise narrow bands 9.

HFC networks also generally suffer from channel distortion, i.e. non-ideal amplitude and phase responses of the channels, which results in inter-symbol interference (ISI). This impairment limits the performance and the data rate that can be transmitted and needs to be compensated for.

A first solution for compensating for ISI is to have an equalizer at the receiver side, i.e. at the CMTS. The equalizer coefficients for a given cable modem are calculated using the preamble of the ranging bursts sent by the cable modem. The computation of the equalizer coefficients is usually carried out by execution of an adaptive algorithm such as the least mean square (LMS) algorithm.

A second solution for compensating for ISI, adopted in the most recent version of DOCSIS specification, is to have a pre-equalizer at each cable modem for pre-compensating for channel distortion in the transmitted data bursts. The pre-equalizer coefficients are computed by an adaptive algorithm at the CMTS upon reception of the ranging bursts, and then sent to the pre-equalizer in the cable modem. The following bursts (traffic bursts), which are used for useful data transmission, benefit from the pre-equalization function, and therefore no channel distortion is observed at the CMTS regarding these bursts. Thus, for channel distortion, the only problem at the CMTS is during the ranging bursts. When ingress noise is present in addition to channel distortion, it is necessary that both channel impairments be compensated for.

Several techniques have been proposed to reduce ingress noise in an HFC network. Some of them are aimed at reducing ingress noise alone. Others are devised to reduce both ingress noise and channel distortion. Prior art solutions are exposed below:

1. Ingress Noise Alone

A classical approach to reduce ingress noise in a receiver when there is no channel distortion, is to create a notch, i.e. a spectral null, in the band where ingress noise is present. This can be done by performing either a linear equalization or a decision feedback equalization.

Figure 3:
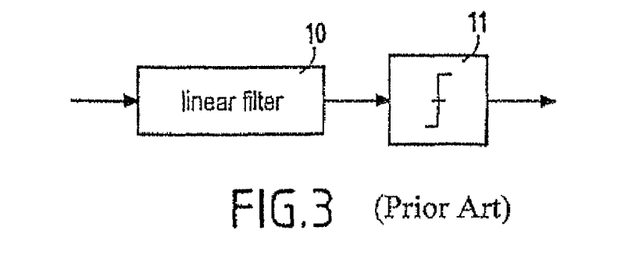
FIG. 3, already discussed, is a block-diagram showing a prior art linear equalizer.

FIG. 3 shows a linear equalizer consisting of a linear filter 10 placed upstream of the decision circuit (threshold detector), designated by the reference numeral 11, of the receiver. The linear filter 10 creates an appropriate notch in the frequency spectrum of the received signal, thus outputting a signal with reduced ingress noise, which is applied to the decision circuit. But while reducing the effect of ingress noise, the notch in the signal spectrum entails ISI. The coefficients of the linear filter 10 must be determined so as to find the best compromise between residual ingress noise, additive white gaussian noise, and the ISI entailed by the filter. These coefficients can be optimized using the well-known minimum mean square error (MMSE) criterion. But in the presence of strong ingress noise, such a linear equalizer leads to very poor performance, because it cannot create a deep notch without entailing an excessive amount of ISI.

Figure 4:
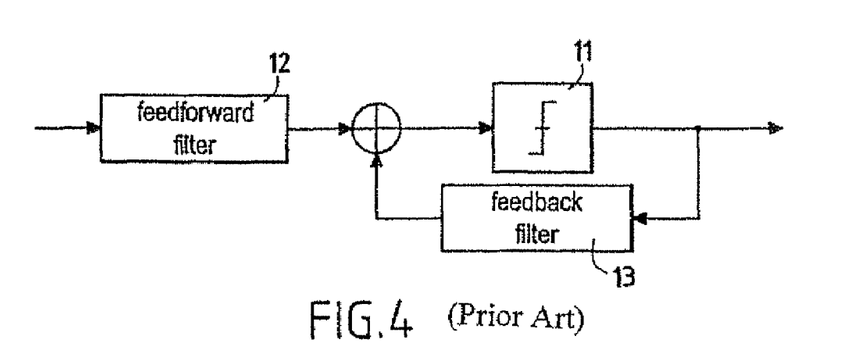
FIG. 4, already discussed, is a block-diagram showing a prior art decision feedback equalizer.

FIG. 4 shows a decision feedback equalizer, composed of a feedforward filter 12 and a feedback filter 13. The feedforward filter 12, placed upstream of the decision circuit 11, creates a deep notch in the frequency spectrum of the received signal thereby canceling most of the ingress noise. The feedback filter 13 compensates for the ISI created by the feedforward filter 12. A description of such a decision feedback equalizer may be found in the article entitled "Advanced receiver to dip ingress noise in HFC return channel", by G. Redaelli et al., published in the conference proceedings of ISPACS 2000.

The results obtained by the equalizer of FIG. 4 in terms of the bit error rate are satisfactory. However, this solution involves two filters and an increased complexity, particularly if compensation of the ISI entailed by the feedforward filter 12 requires a large number of coefficients in the feedback filter 13.

2. Ingress Noise Combined with Channel Distortion

When ingress noise is combined with channel distortion, the same types of equalizer as those shown in FIGS. 3 and 4 may be used. The difference, here, is that ISI is also present in the received signal and is not just generated by the equalizer filters. Therefore, if a linear equalizer of the type as shown in FIG. 3 is used, a compromise must be found between ingress noise, additive white gaussian noise and ISI, which yields very poor performance because a deep notch cannot be performed without creating an excessive amount of ISI. In the case of a decision-feedback equalizer as shown in FIG. 4, the feedforward filter creates a notch so as to reduce the ingress noise, and the feedback filter removes the ISI induced by this notch as well as the ISI due to the channel distortion.

Although the decision-feedback equalizer of FIG. 4 enables the decision circuit to decide on the received symbols with very few errors, even in the presence of channel distortion, it has several drawbacks, as explained below.

Depending on the solution adopted for compensating for channel distortion, the DFE shown in FIG. 4, when used in an HFC network, could serve either to equalize the received traffic bursts in the receiver (when no pre-equalizer is used in the cable modems) or merely to compute, based on received ranging bursts, proper coefficients to be sent to the pre-equalizers in the cable modems (the equalization of the traffic bursts being performed in the transmitters).

In the two cases, the equalization coefficients aim at compensating for both ISI and ingress noise. Thus, when either one of ISI and ingress noise varies, the coefficients need to be adapted accordingly.

However, ISI and ingress noise are two independent phenomena, which vary differently. As already explained, ingress noise is slowly time-varying and does not depend on which cable modem is transmitting. By contrast, channel distortion completely changes from burst to burst, because the successive data bursts received at the CMTS do not originate from the same cable modem. As the cable modems are at different physical locations, the data bursts do not suffer from the same channel distortion.

In the case where equalization for the traffic bursts is carried out at the CMTS, the equalization coefficients therefore have to be recomputed at each new burst. Such recomputation is usually performed using the preamble of each traffic burst.

However, as the equalization coefficients must compensate for both ISI and ingress noise, these coefficients need to be adapted each time from scratch as regards ingress noise, even if ingress noise has not varied since the previous recomputation.

This implies that a long preamble must be provided in each traffic burst in order to allow the adaptive algorithm to converge before receiving the useful data following the preamble. Providing long preambles in the data bursts reduces the available channel capacity for transmitting useful data.

An alternative to the recomputation of the equalizer coefficients could be to store them in the CMTS and to load the equalizer with the appropriate coefficients at each new burst. Such a solution would however require a considerable storage capacity at the CMTS.

In the case where equalization for the traffic bursts is carried out by pre-equalizers at the cable modems, there is generally no need, as far as ISI is concerned, to recompute the equalization coefficients at each new burst, since ISI in each data burst received at the CMTS were previously pre-compensated for at the corresponding cable modem. Nevertheless, as the equalization coefficients also depend on ingress noise, a problem arises in that, each time ingress noise has varied, the coefficients for all cable modems should be recomputed at the CMTS to be resent to the cable modems. Due to the generally high number of cable modems associated with a given CMTS, this solution cannot be seriously envisioned in practice.

It will further be noted that, in any case, the prior art does not allow the filter coefficients to be continuously adapted to the slow variations of ingress noise in an HFC network.

Another difficulty with the prior art lies in that the coefficients of the feedforward filter and the feedback filter need to be adapted at the same time, which increases the amount of calculations to be done during a same time interval.

OBJECTS AND SUMMARY OF THE PRESENT INVENTION

A first object of the present invention is to provide, in a simpler manner than in the prior art, efficient reduction of ingress noise without generation of ISI, when no channel distortion is present.

This first object is attained according to the invention by a device for reducing ingress noise in a digital signal, characterized in that it comprises noise predicting means for predicting an amount of ingress noise in the digital signal, and subtracting means for subtracting the predicted amount of ingress noise from the digital signal.

Thus, the present invention uses noise predicting means, instead of a DFE, to reduce ingress noise. This is made possible by the fact that ingress noise is a narrow band interference and is therefore strongly correlated. The correlation of ingress noise enables the latter to be predicted based on past samples thereof.

An advantage of using noise prediction is that it does not induce ISI. Noise prediction acts only on the ingress noise, without affecting the useful data. There is therefore no need to provide a further filter, as in the prior art, to compensate for ISI caused by the reduction of ingress noise.

Typically, the noise predicting means comprise a noise predictor comprising a storage unit for receiving and storing past samples of the ingress noise and a linear noise predicting filter for predicting said amount of ingress noise based on the past samples, decision means for outputting symbols corresponding to samples of the digital signal, and second subtracting means for subtracting said symbols from said samples of the digital signal to provide said past samples of the ingress noise.

Thus, a single linear filter, i.e. the linear noise predicting filter, is enough to efficiently reduce or even to cancel ingress noise in the digital signal. The ingress noise reduction device of the present invention therefore exhibits lower complexity than the prior art.

Preferably, the device according to the invention comprises adaptation means for adapting coefficients of the linear noise predicting filter to variations of the ingress noise in the digital signal. The adaptation means may be arranged to perform an adaptive algorithm, and more particularly an adaptive algorithm using tap leakage for stabilizing the coefficients of the linear noise predicting filter.

A second object of the present invention is to solve the above-mentioned problems concerning adaptation of the filtering coefficients when channel distortion is present, and more generally to enable both the ingress noise and the channel distortion to be compensated for while still permitting easy adaptation of the various filtering coefficients.

This second object is attained by adding to the ingress noise reduction device of the invention an equalizer having noise-independent coefficients, such as a zero-forcing (ZF) equalizer, for compensating for ISI in the digital signal.

The present invention thus decouples the treatment of ISI and ingress noise, each treatment being made by a distinct filter, namely the equalizer, for ISI, and the noise predicting filter, for ingress noise. By contrast with the prior art, the present invention exploits the fact that ISI and ingress noise do not have the same origin and vary differently.

In the present invention, adaptive algorithms may be executed for adapting the coefficients of the noise predicting filter and the equalizer without such algorithms interfering with each other. The equalizer coefficients may be optimized to compensate for ISI, whereas the noise predicting filter coefficients may be optimized to compensate for ingress noise. As the noise predicting filter coefficients are independent of ISI, they can be adapted only when they need be. In the same manner, the equalizer coefficients may be adapted to any change in ISI without taking into account ingress noise.

Specifically, when the device according to the invention is used in a CMTS of an HFC network and the noise-independent equalizer serves to compensate for ISI in the received traffic bursts, one can keep the noise predicting filter coefficients from one data burst to another and adapt only the equalizer coefficients, instead of adapting each time the coefficients from scratch as is performed in the prior art. The result of this better convergence speed is a significant gain in system throughput (useful data rate) because the preamble length in the data bursts can be kept much smaller.

Alternatively, the noise-independent equalizer used in the present invention may serve to compensate for ISI only in ranging bursts received at the CMTS, the coefficients obtained at the end of each ranging burst being sent to a pre-equalizer at the corresponding cable modem. In the present invention, since the pre-equalizer coefficients are independent of ingress noise (they are computed in the noise-independent equalizer at the CMTS), ingress noise is treated only at the receiver. There is therefore no need to recompute all the equalizer coefficients at the CMTS when ingress noise has varied.

Advantageously, in the present invention, the equalizer is placed upstream of the noise predicting means.

The present invention also provides a digital receiver comprising an ingress noise reduction device as defined above and phase compensation means arranged to receive an output signal of the subtracting means of the ingress noise reduction device, to recover a carrier phase in the output signal and to compensate the carrier phase in the output signal before the output signal is applied to the decision means.

The present invention also provides a communication system for use as a termination system for a plurality of transmitters in a TDMA network, the communication system comprising a modulator, a demodulator and a control unit, wherein the demodulator comprises an ingress noise reduction device as defined above and the control unit is arranged to control the adaptation means of the ingress noise reduction device so that the coefficients of the linear noise predicting filter are adapted at least during reserved time slots in which no transmitter is allowed to transmit towards the communication system. Such a communication system may consist of a CMTS for an HFC network.

Adapting the noise predicting filter coefficients during reserved time slots in which no transmitter is allowed to transmit, avoids resorting to training sequences. Furthermore, as no data is transmitted during the reserved time slots, the received signal is essentially composed of noise and does not suffer from ISI. Adaptation of the noise predicting filter coefficients may be carried out even if the equalizer coefficients have not yet been computed.

Typically, during the reserved time slots in which no transmitter is allowed to transmit, the decision means of the ingress noise reduction device are controlled by the control unit so that the decision symbols output by the decision means are systematically equal to zero.

According to one variant of the communication system of the invention, the adaptation means are controlled by the control unit so that the coefficients of the linear noise predicting filter are adapted only during the reserved time slots in which no transmitter is allowed to transmit towards the communication system.

According to another variant of the communication system of the invention, the adaptation means are controlled by the control unit so that the coefficients of the linear noise predicting filter are continuously adapted both during the reserved time slots in which no transmitter is allowed to transmit towards the communication system and during time slots allocated for data transmission from the transmitters.

The present invention also provides an HFC network comprising a termination system as defined above.

The present invention further provides a method for reducing ingress noise in a digital signal, characterized in that it comprises the steps of predicting an amount of ingress noise in the digital signal, and subtracting the predicted amount of ingress noise from the digital signal.

Typically, said amount of ingress noise in the digital signal is predicted based on past samples of the ingress noise obtained by subtracting decision symbols corresponding to samples of the digital signal from said samples of the digital signal.

The method according to the invention may further comprise equalizing the digital signal by means of an equalizer having noise-independent coefficients, for compensating for inter-symbol interference in the digital signal. The equalization of the digital signal may be carried out in a receiver, before the ingress noise prediction, or in the form of a pre-equalization in a transmitter.

Advantageously, the coefficients of a linear noise predicting filter used for predicting said amount of ingress noise are adapted to variations of the ingress noise in the digital signal.

The adaptation of the coefficients of the linear noise predicting filter may be carried out by execution of an adaptive algorithm which uses tap leakage for stabilizing the coefficients.

Advantageously, the digital signal is received in a termination system for transmitters in a TDMA network, the ingress noise prediction, the subtraction of the predicted amount of ingress noise from the digital signal and the adaptation of the coefficients of the linear noise predicting filter are carried out in the termination system, and the adaptation of the coefficients of the linear noise predicting filter is carried out at least during reserved time slots in which no transmitter is allowed to transmit towards the termination system. In such a case, the decision symbols are preferably systematically set to zero during the reserved time slots.

DETAILED DESCRIPTION OF PREFERRED EMBODIMENTS

Figure 5:
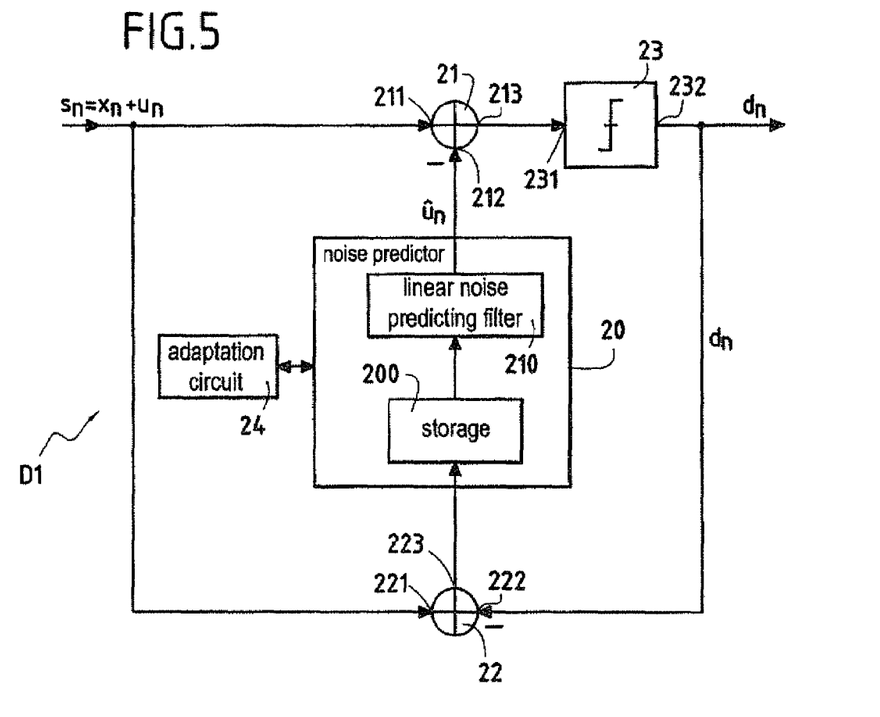
FIG. 5 is a block-diagram showing an ingress noise reduction device according to a first embodiment of the present invention.

FIG. 5 shows an ingress noise reduction device D1 according to a first embodiment of the present invention. The device D1 aims at reducing or canceling ingress noise in a digital receiver when no channel distortion is present. In the following, the device D1 will be described, for illustration purposes only, in the context of an HFC network of the type as shown in FIG. 1, with the digital receiver typically consisting of the demodulator of a CMTS.

The device D1 comprises a noise predictor 20 including a storage unit 200 and a linear noise predicting filter 210, a first subtractor 21, a second subtractor 22 and a decision circuit, or threshold detector, 23. The decision circuit 23 typically consists of the decision circuit of the digital receiver.

When in use, the device D1 receives samples of a digital signal. Each received sample, and more precisely the complex amplitude thereof, may be represented by a complex number $s_n$ which satisfies the following relation:

$$s_n = x_n + u_n$$

where $x_n$ is a complex number representing the complex amplitude of the useful data and $u_n$ is a complex number representing the complex amplitude of the noise in the received sample $s_n$.

Each noise sample $u_n$ can be expressed as follows:

$$u_n = i_n + w_n$$

where $i_n$ is a complex number representing the complex amplitude of the ingress noise and $w_n$ is a complex number representing the complex amplitude of the white gaussian noise in the received sample $s_n$.

The samples $s_n$ are applied to a first input 211 of the first subtractor 21 and to a first input 221 of the second subtractor 22. At a second input 212 of the first subtractor 21 an estimator $\hat{u}_n$ is provided for each noise sample $u_n$. The estimator $\hat{u}_n$ is a predicted value of the noise sample $u_n$, which is produced by the noise predictor 20 based on past noise samples $u_{n-1}, u_{n-2}, \ldots, u_{n-M}$. At the output of the first subtractor 21, designated by the reference numeral 213, the following sample is delivered:

$$s_n - \hat{u}_n = x_n + u_n - \hat{u}_n$$

Assuming that $\hat{u}_n$ is a good estimator of the noise sample $u_n$, then the sample at the output 213 of the first subtractor 21 substantially corresponds to the useful data sample $x_n$, which implies that the presence of ingress noise in the received signal sample $s_n$ has been significantly reduced. As the noise predictor 20 only acts on past noise samples and does not affect the useful data, ingress noise reduction is obtained without generating ISI.

The sample $(s_n - \hat{u}_n)$ is applied to an input 231 of the decision circuit 23. The decision circuit 23 takes a decision by comparing this sample with a set of predetermined thresholds, in order to deliver a symbol $d_n$ representative of the useful data sample $x_n$ at its output 232. Assuming that the decision taken by the decision circuit 23 is correct, which, in practice, is the most frequent case, then we have:

$$d_n = x_n$$

The decided symbol $d_n$ is applied to a second input 222 of the second subtractor 22, to be subtracted from the sample $s_n$. At the output of the second subtractor 22, designated by the reference numeral 223, the following sample is delivered:

$$s_n - d_n = x_n + u_n - d_n = u_n$$

Thus, the noise sample $u_n$ is applied to the input of the noise predictor 20, to be stored in the storage unit 200 thereof. The linear noise predicting filter 210 calculates the estimator $\hat{u}_{n+1}$ for the next sample $s_{n+1}$ to be received by the device D1, based on the noise sample $u_n$ and on the previous noise samples $u_{n-1}, \ldots, u_{n-M+1}$ which were kept in the storage unit 200. Typically, the storage unit 200 may consist of a mere shift register.

Figure 9:
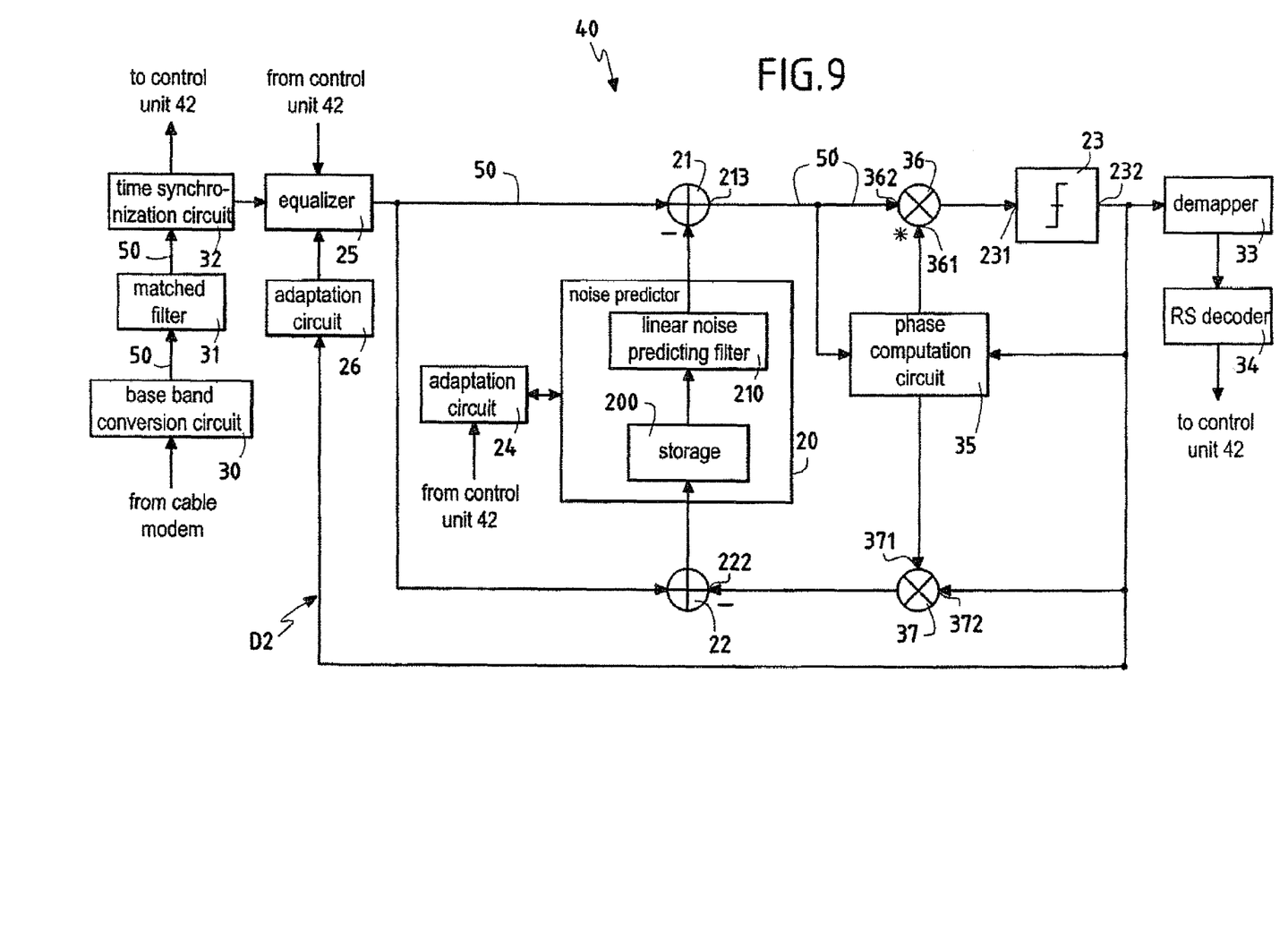
FIG. 9 is a block-diagram showing a demodulator incorporating the ingress noise reduction device of FIG. 8.

The operation of the device D1 is cadenced by the rhythm of the received digital signal, which rhythm is recovered upstream in the digital receiver by a time synchronization circuit (shown in FIG. 9 by the reference 32). For instance, the device D1 is controlled so that the estimator $\hat{u}_n$ be subtracted from the received sample $s_n$ by the first subtractor 21 at the beginning of a time cycle and the next estimator $\hat{u}_{n+1}$ be produced by the noise predictor 20 at the end of the same time cycle, to be available for being subtracted from the next received sample $s_{n+1}$ at the beginning of the next time cycle.

The linear noise predicting filter 210 has the following transfer function:

$$H(z) = \sum_{k=1}^{M} c_k^* z^{-k}$$

and computes each estimator $\hat{u}_n$ in the following manner:

$$\hat{u}_n = \sum_{k=1}^{M} c_k^* u_{n-k}$$

where $c_k$ are the coefficients of the linear noise predicting filter 210.

The coefficients $c_k$ are calculated by an adaptation circuit 24 which is connected to the noise predictor 20.

These coefficients can be obtained by inversion of the autocorrelation matrix of the noise. This technique however requires a great deal of calculations.

In the present invention, the calculation of the filter coefficients $c_k$ is preferably carried out by means of an adaptive algorithm, such as the LMS algorithm, performed by the adaptation circuit 24. The LMS algorithm is a gradient-type algorithm which seeks to minimize the mean square error $|\hat{u}_n - u_n|^2$.

Specifically, each estimator $\hat{u}_n$ is calculated at a stage (or time cycle) n−1 using coefficients $c_k^n$, as expressed below:

$$\hat{u}_n = \sum_{k=1}^{M} c_k^{n*} u_{n-k}$$

At the following stage n, coefficients $c_k^{n+1}$, which will be used for computing the estimator $\hat{u}_{n+1}$, are obtained by the following relation:

$$\begin{pmatrix} c_1^{n+1} \\ c_2^{n+1} \\ \vdots \\ \vdots \\ c_M^{n+1} \end{pmatrix} = \begin{pmatrix} c_1^n \\ c_2^n \\ \vdots \\ \vdots \\ c_M^n \end{pmatrix} + \Delta \times (u_n - \hat{u}_n)^* \begin{pmatrix} u_{n-1} \\ u_{n-2} \\ \vdots \\ \vdots \\ u_{n-M} \end{pmatrix}$$

where $\Delta$ is the adaptation step size of the algorithm.

The coefficients $c_k$ are all initialized to zero at the instant when the digital receiver is turned on. A number of initial samples $u_n$ are necessary for the algorithm to converge, i.e. to reach the minimum value of the mean square error $|\hat{u}_n - u_n|^2$. The value of the adaptation step size $\Delta$ must be chosen small enough to avoid divergence but high enough to allow reasonably fast convergence.

The convergence phase may be carried out on the basis of a training sequence of symbols, i.e. typically the preamble of a ranging burst initially received by the digital receiver after the latter has been turned on. Such a training sequence is known in advance by the digital receiver, and pre-stored therein. Upon receiving the training sequence from the corresponding cable modem, the decision circuit 23 is controlled to output decisions $d_n$ which are equal to the symbols $x_n$ pre-stored in the digital receiver. During the convergence phase, the algorithm is thus performed using errorless decisions $d_n$ and correct past samples $u_{n-1}, \ldots, u_{n-M}$.

Once the algorithm has converged, the algorithm may be stopped. Ingress noise prediction for the following data (i.e. the information field following the training sequence in the initial ranging burst and the preambles and information fields of the subsequent ranging and traffic data bursts) is then carried out using the coefficients obtained at the end of the convergence phase. The coefficients are however updated at predetermined instants, for instance periodically, on the basis of training sequences formed by the preambles of data ranging or traffic bursts. Preferably, the starting values taken for the coefficients at the beginning of each updating phase are the values obtained at the end of the previous updating phase. Initialization of the coefficients to zero is performed only at the instant when the digital receiver is turned on.

As a variant, after convergence of the adaptive algorithm, the latter may be continued. The coefficients are thus continuously adapted to the slow variations of ingress noise. When the data being received are part of a ranging or traffic data burst preamble, the decision circuit 23 is controlled to give to the decisions $d_n$ the values of the symbols $x_n$ which are pre-stored in the digital receiver, so as to use errorless decisions for the noise prediction and the adaptation of the coefficients $c_k$. On the other hand, when the data being received are part of an information field (useful data) of a ranging or traffic data burst, the decision circuit 23 produces the decisions $d_n$ by comparing the received samples $s_n$ with the predetermined thresholds.

As an alternative to the use of training sequences for adapting, i.e. computing or updating, the coefficients, it is proposed according to the present invention to adapt the coefficients $c_k$ using empty bursts, namely bursts including no data, but only noise.

Precisely, in the HFC network incorporating the digital receiver, time slots are reserved for adapting the coefficients $c_k$ of the linear noise predicting filter 210. During these reserved time slots, no cable modem is allowed to transmit. Thus, the signal received by the digital receiver is essentially composed of noise:

$$s_n = u_n$$

During the same reserved time slots, the decision circuit 23 is controlled to systematically deliver decisions $d_n$ which are equal to 0. The samples $(s_n-d_n)$ received by the noise predictor 20 therefore exactly correspond to the noise samples $u_n$.

An initial time slot is reserved for computing the coefficients $c_k$ just after the digital receiver has been turned on. Subsequent time slots are reserved at predetermined instants, for instance periodically, for updating the coefficients. The length of each reserved time slot is chosen sufficiently large to enable the LMS algorithm to converge. Ingress noise in each (non-empty) data burst received from the cable modems is compensated for based on the last coefficients calculated during the preceding time slot reserved for adaptation. Preferably, the starting values taken for the coefficients at the beginning of each updating phase are the values obtained at the end of the preceding updating phase. Initialization of the coefficients $c_k$ to zero is performed only at the instant when the digital receiver is turned on, i.e. for the initial reserved time slot.

As a variant, the filter coefficients $c_k$ are continuously adapted to the slow variations of ingress noise, i.e. the adaptive algorithm is not stopped at the end of each reserved time slot (empty burst), but is continued upon reception of the data bursts. During the reserved time slots in which the cable modems are not allowed to transmit, the decision circuit 23 is controlled to always give to the decisions $d_n$ the value of zero. On the other hand, during the time slots allocated for data transmission from the cable modems, the adaptive algorithm uses decisions $d_n$ which are obtained by comparing the received samples $s_n$ with the predetermined thresholds when the data being received are useful data, and uses the symbols $x_n$ pre-stored in the receiver when the data being received are part of a burst preamble.

Using empty bursts for adapting the coefficients has several advantages.

In particular, this solution does not require the transmission of long training sequences from the cable modems. Although, as previously explained, such training sequences may conveniently consist of the preambles of the ranging and traffic data bursts, it is important to note that, in any case, the training sequences must be sufficiently long for the adaptive algorithm to be able to converge. Lengthening the preambles of the ranging and traffic data bursts for enabling the adaptive algorithm to converge has the drawback that less transmission capacity is available for the useful data. Furthermore, in some standard HFC networks, in particular those conforming to the DOCSIS specification, the length of the preambles may sometimes be insufficient and cannot be changed. Thus, in order to adapt the coefficients using training sequences, it is necessary for the CMTS to ask a cable modem to send a specific training sequence having the required length each time the coefficients need to be adapted. The solution with empty bursts avoids soliciting the cable modems for adapting the coefficients.

In practice, reserving time slots for adaptation of the coefficients is easy to implement. Most TDMA systems allow the insertion of specific time slots between time slots allocated for data transmission. Furthermore, this solution does not necessarily imply a loss of transmission capacity for the useful data, since the empty bursts may be inserted at instants when no data transmission is occurring.

Figure 6:
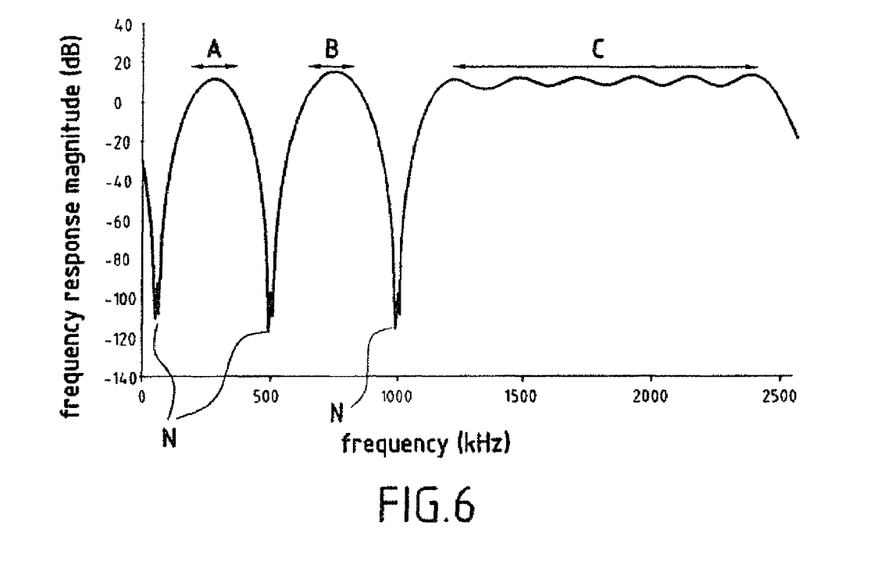
FIG. 6 is a diagram showing the frequency response of a prediction-error filter in the embodiment of FIG. 5.

FIG. 6 shows the frequency response without additive white gaussian noise of the prediction-error filter formed by the noise predictor 20 and the first subtractor 21. This filter is considered to receive the digital signal $u_n$ at its input and to deliver the signal $(u_n - \hat{u}_n)$ at its output. It is represented by the following transfer function:

$$A(z) = 1 - H(z) = 1 - c_1'z^{-1} - c_2'z^{-2} \ldots - c_M'z^{-M}$$

As shown in FIG. 6, the frequency response of this filter exhibits notches, referenced N, at the frequencies where ingress noise is present in the received signal $s_n$. The transfer function $A(z)$ is constrained by ingress noise in the frequency sub-bands of the signal where ingress noise is present, but in the other parts of the signal band, shown in FIG. 6 by the reference signs A, B and C, it is only constrained by the additive white gaussian noise. When the signal to noise ratio is too high, the transfer function $A(z)$ is not constrained in the signal sub-bands A, B, C where no ingress noise is present, so that the coefficients of the linear noise predicting filter 210 may become unstable. In other words, as no constraint exists on the transfer function $A(z)$ in the signal sub-bands A, B, C, the adaptive algorithm run by the adaptation circuit 24 will find, at each stage n, a solution for the coefficients $c_k$ among an infinity of possible solutions. The coefficients $c_k$ may therefore take very high values, and even reach saturation values. Such an unstable situation must preferably be avoided.

Thus, according to a variant of the present invention, in order to provide stability to the coefficients $c_k$ of the linear noise predicting filter 210, the adaptive algorithm executed by the adaptation circuit 24 is modified according to the so-called "tap leakage technique" to take into account the global gain of the filter $A(z)$, i.e. the sum of the square modulus of the coefficients. The adaptation equation is in this case:

$$\begin{pmatrix} c_1^{n+1} \\ c_2^{n+1} \\ \vdots \\ c_M^{n+1} \end{pmatrix} = (1 - \mu \times \Delta) \begin{pmatrix} c_1^n \\ c_2^n \\ \vdots \\ c_M^n \end{pmatrix} + \Delta \times (u_n - \hat{u}_n)^* \begin{pmatrix} u_{n-1} \\ u_{n-2} \\ \vdots \\ u_{n-M} \end{pmatrix}$$

Figure 7A:
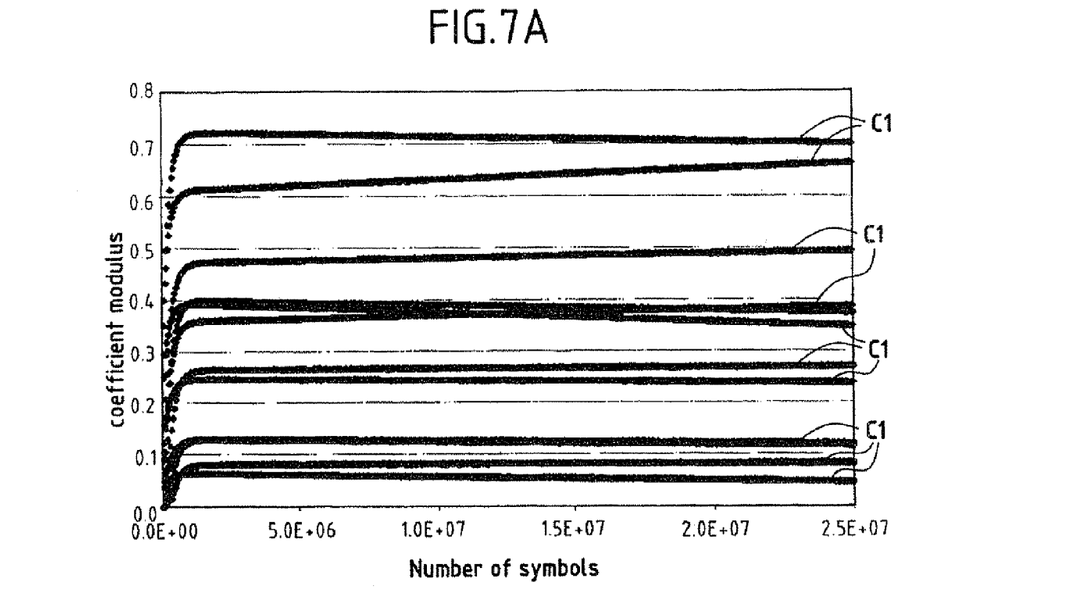
FIGS. 7A and 7B are diagrams showing an evolution of the modulus of coefficients of a linear noise predicting filter in the embodiment of FIG. 5.
Figure 7B:
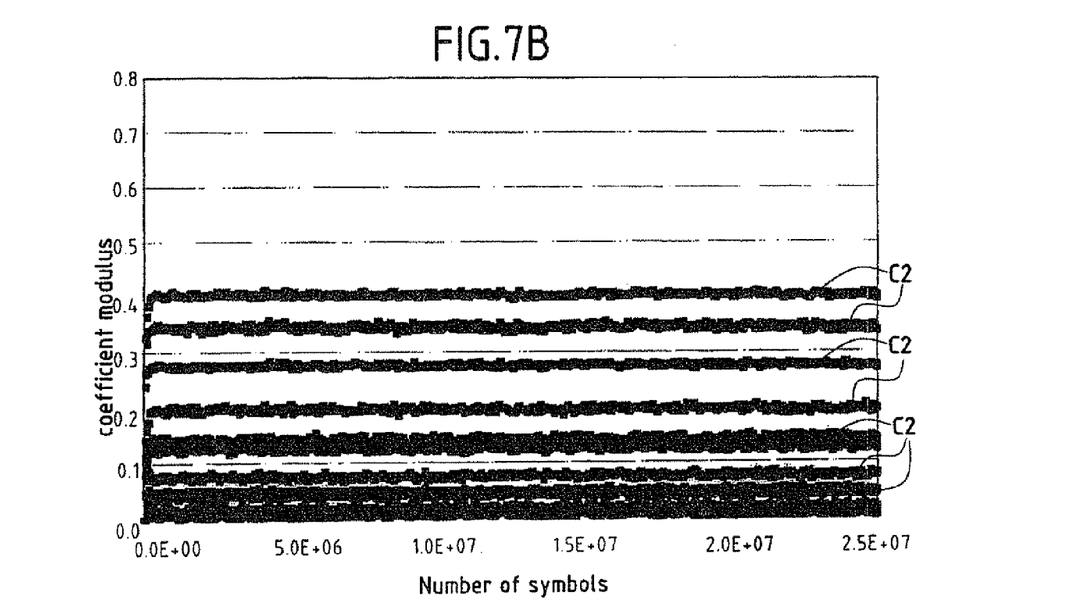

The effect of this tap leakage is to add an artificial white noise to the samples $u_n$ in the adaptive algorithm (but not in the useful signal). Therefore, a constraint is put on the transfer function $A(z)$ in the whole frequency band of the signal, including the sub-bands A, B, C where no ingress noise is present. FIGS. 7A and 7B present an illustration of this by plotting the modulus of the coefficients with no white gaussian noise. Two types of curves are plotted: the curves C1, in FIG. 7A, represent the coefficients without tap leakage ($\mu=0$) and the curves C2, in FIG. 7B, represent the coefficients with tap leakage ($\mu=0.001$). It appears that, without tap leakage, the coefficients never reach a stable point. This problem is overcome when tap leakage is employed.

Figure 8:
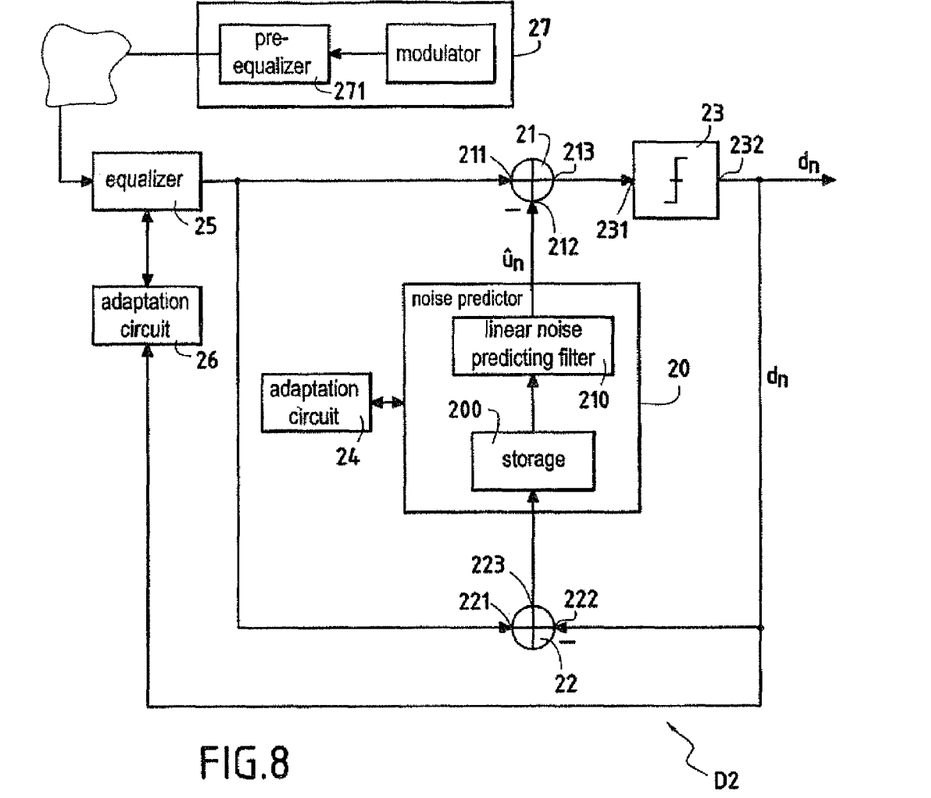
FIG. 8 is a block-diagram showing an ingress noise reduction device according to a second embodiment of the present invention.

FIG. 8 shows an ingress noise reduction device D2 according to a second embodiment of the present invention. The device D2 aims at reducing or canceling ingress noise in a digital receiver, in the presence of channel distortion. In FIG. 8, those elements that are identical to elements of the device D1 of FIG. 5 are designated by the same reference numerals.

The device D2 according to the second embodiment of the present invention differs from the device D1 according to the first embodiment only in that it further comprises a noise-independent coefficient equalization filter 25, such as a zero-forcing (ZF) equalizer, placed upstream of the first subtractor 21 and the second subtractor 22, and an adaptation circuit 26 for adapting the coefficients of the equalizer 25.

The equalizer 25 serves to compensate for ISI in the signal received by the digital receiver. As the coefficients of the equalizer 25 are independent of noise and the coefficients of the linear noise predicting filter 210 are independent of ISI, the treatments performed by the filters 25 and 210 do not interfere with each other. The coefficients of the equalizer 25 may be adapted independently of the variations of ingress noise. Adaptation of the coefficients of the equalizer 25 is carried out, for example, by means of an adaptive algorithm, such as the LMS algorithm, executed by the adaptation circuit 26. Like the adaptation circuit 24, the adaptation circuit 26 uses the decisions $d_n$ delivered by the decision circuit 23 to determine an error signal.

When used in an HFC network which conforms to the DOCSIS specification, and in which a pre-equalizer is provided in each transmitter (cable modem), as shown in FIG. 8 where the pre-equalizer is referenced 271 and the cable modem is referenced 27, the equalizer 25 serves to compensate for ISI in the ranging data bursts. The preamble of each ranging data burst is used to make the adaptive algorithm converge. After this initial convergence, the algorithm is continued on the information field (useful data) in the ranging data burst. The coefficients obtained at the end of the ranging data burst are then sent to the pre-equalizer 271 in the transmitter 27, and will serve to pre-compensate for ISI in the following traffic data bursts which will be sent by the transmitter 27. After being sent to the transmitter 27, the coefficients in the equalizer 25 are reinitialized. Upon reception of the traffic data bursts by the digital receiver, the equalizer 25 may be deactivated, or may be used to further equalize the received data. In the latter case, the equalizer 25 operates in addition to the pre-equalizer 271 to improve ISI compensation.

FIG. 9 is a block-diagram showing a demodulator 40 incorporating the ingress noise reduction device D2. The demodulator 40 comprises, upstream of the device D2, a base band conversion circuit 30, a matched filter 31 and a time synchronization circuit 32 for recovering the rhythm of the received signal, and, downstream of the device D2, a demapper 33 and a Reed-Solomon (RS) decoder 34. The demodulator 40 further includes a phase computation circuit 35 for recovering the carrier phase of the digital signal received by the demodulator 40.

The phase computation circuit 35 is connected to the output 213 of the first subtractor 21, to the output 232 of the decision circuit 23, as well as to a first input 361 of a first multiplier 36 and to a first input 371 of a second multiplier 37. The first multiplier 36 receives at a second input 362 the signal delivered by the output 213 of the first subtractor 21, multiplies this signal by $e^{-j\phi}$, where $\phi$ is the carrier phase recovered by the phase computation circuit 35, and delivers the multiplication result to the input 231 of the decision circuit 23. The second multiplier 37 receives at a second input 372 the decision signal delivered by the output 232 of the decision circuit 23, multiplies the decision signal by $e^{j\phi}$, and delivers the multiplication result to the second input 222 of the second subtractor 22. Thus, the function of the phase computation circuit 35 is to compensate the carrier phase in the received digital signal before the latter is applied to the decision circuit 23 and to reintroduce the carrier phase into the decision signal before carrying out the noise prediction. In the present invention, as the phase computation is carried out after the noise prediction, the phase computation circuit 35 receives a digital signal without ingress noise, and can therefore efficiently recover the carrier phase.

Although not shown in the Figures, each connection 50 between two given blocks comprises, in a known manner, two parallel links, one for the real portion of the complex signals and the other for the imaginary portion of the complex signals.

The demodulator 40 as shown in FIG. 9 is suitable for demodulating digital signals suffering from both ISI and ingress noise since it uses the device D2 according to the second embodiment of the invention, which comprises the equalizer 25 in addition to the noise predictor 20. However, when no channel distortion is present, the demodulator 40 may merely comprise the device D1 according to the first embodiment of the invention, i.e. the equalizer 25 and its adaptation circuit 26 may be omitted.

Figure 10:
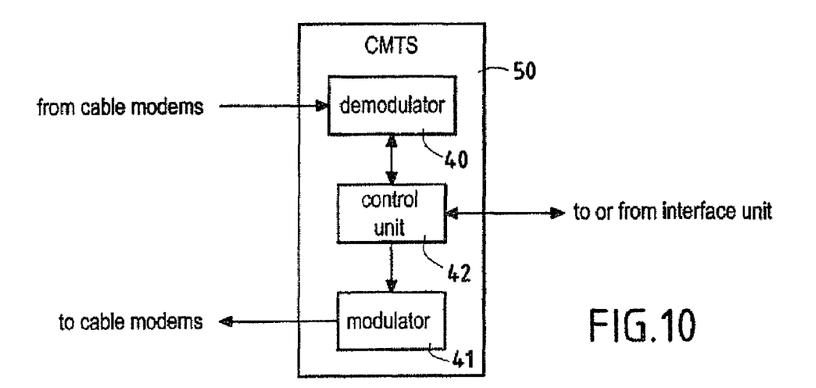
FIG. 10 is a block-diagram showing a CMTS incorporating the demodulator of FIG. 9.

FIG. 10 shows a CMTS 50 incorporating the demodulator 40. The CMTS 50 comprises, besides the demodulator 40, a modulator 41 and a control unit 42. The demodulator 40 serves to demodulate data received from the cable modems. The modulator 41 serves to modulate data to be transmitted to the cable modems. The control unit 42 controls the operation of the CMTS, manages the TDMA protocol in the HFC network and interfaces with the interface unit of the head-end. More specifically, it is the control unit 42 which allocates the time slots to the cable modems and which reserves time slots in which no cable modem is allowed to transmit for adapting the coefficients of the linear noise predicting filter 210. Time slot allocation and reservation is performed in the control unit 42 by means of a scheduler program. The control unit 42 also controls the adaptation circuits 24, 26, cadences the ingress noise reduction device D2 based on the rhythm of the received digital signal recovered by the time synchronization circuit 32, and activates or deactivates the equalizer 25 depending on whether the data bursts being received are ranging or traffic bursts.

Although the present invention has been described in the context of HFC networks, it will be clearly apparent to the skilled person that the invention is not limited to such networks and may also be applied, for instance, to systems based on ADSL, VDSL, etc.

The invention claimed is:

1. A device, comprising:
   a linear noise predictor configured to determine an amount of predicted noise ($\hat{u}_n$) at a time cycle n in a sample ($s_n$) of digital data using predictor coefficients, wherein the sample comprises useful data ($x_n$) and an actual noise sample ($u_n$);
   an adaptation circuit configured to determine the predictor coefficients of the linear noise predictor for a future time cycle n+1 based on an adaptation step size associated with the predictor coefficients determination, the predicted noise ($\hat{u}_n$) at the time cycle n, actual noise samples ($u_n$) at time cycles n, n−1, n−2, . . . n−M and predictor coefficients from time cycle n;
   a first subtractor configured to subtract the amount of predicted noise ($\hat{u}_n$) from the sample ($s_n$) of the digital data to produce subtracted data ($s_n-\hat{u}_n$);
   a decision circuit configured to compare the subtracted data ($s_n-\hat{u}_n$) with a set of thresholds to produce a decided symbol ($d_n$) representative of the useful data ($x_n$) in the sample ($s_n$); and a second subtractor configured to subtract the decided symbol ($d_n$) from the sample ($s_n$) to produce the actual noise sample ($u_n$).

2. The device of claim 1, wherein the adaptation circuit is configured to determine the predictor coefficients ($c_k^{n+1}$) of the linear noise predictor for the future time cycle n+1 according to:

$$\begin{pmatrix} c_1^{n+1} \\ c_2^{n+1} \\ \vdots \\ c_M^{n+1} \end{pmatrix} = \begin{pmatrix} c_1^n \\ c_2^n \\ \vdots \\ c_M^n \end{pmatrix} + \Delta \times (u_n - \hat{u}_n)^* \begin{pmatrix} u_{n-1} \\ u_{n-2} \\ \vdots \\ u_{n-M} \end{pmatrix}$$

where $\Delta$ is the adaptation step size,
$u_n, u_{n-1}, \ldots, u_{n-M}$ are the actual noise samples at time cycles n, n−1, ..., n−M, and $\hat{u}_n$ is the amount of predicted noise at time cycle n.

3. The device of claim 2, wherein the linear noise predictor determines the amount of predicted noise $\hat{u}_n$ according to:

$$\hat{u}_n = \sum_{k=1}^{M} c_k^{n*} u_{n-k}$$

where $c_k^n$ are the predictor coefficients of the linear noise predictor at the time cycle n.

4. The device of claim 1, wherein the adaptation circuit is further configured to determine the predictor coefficients of the linear noise predictor for the future time cycle n+1 based further on a tap leakage constant.

5. The device of claim 4, wherein the adaptation circuit is configured to determine the predictor coefficients ($c_k^{n+1}$) of the linear noise predictor for the future time cycle n+1 according to:

$$\begin{pmatrix} c_1^{n+1} \\ c_2^{n+1} \\ \vdots \\ c_M^{n+1} \end{pmatrix} = (1 - \mu \times \Delta) \begin{pmatrix} c_1^n \\ c_2^n \\ \vdots \\ c_M^n \end{pmatrix} + \Delta \times (u_n - \hat{u}_n)^* \begin{pmatrix} u_{n-1} \\ u_{n-2} \\ \vdots \\ u_{n-M} \end{pmatrix}$$

where $\Delta$ is the adaptation step size,
$\mu$ is the tap leakage constant,
$u_n, u_{n-1}, \ldots, u_{n-M}$ are the actual noise samples at time cycles n, n−1, ..., n−M, and
$\hat{u}_n$ is the amount of predicted noise at time cycle n.

6. The device of claim 1, further comprising:
a storage unit configured to receive and store actual noise samples ($u_{n-i}$) from the second subtractor, where i designates past time cycles.

7. The device of claim 1, wherein the adaptation circuit is further configured to minimize the mean square error ($|\hat{u}_n - u_n|^2$) of the actual noise sample ($u_n$).

8. A method, comprising:
determining an amount of predicted noise ($\hat{u}_n$) at a time cycle n in a sample ($s_n$) of digital data using predictor coefficients, wherein the sample comprises useful data ($x_n$) and an actual noise sample ($u_n$);
determining the predictor coefficients of the linear noise predictor for a future time cycle n+1 based on an adaptation step size associated with the predictor coefficients determination, the predicted noise ($\hat{u}_n$) at a time cycle n, actual noise samples ($u_n$) at time cycles n, n−1, n−2, ... n−M and predictor coefficients from time cycle n;
subtracting the amount of predicted noise ($\hat{u}_n$) from the sample ($s_n$) of the digital data to produce subtracted data ($s_n - \hat{u}_n$);
comparing the subtracted data ($s_n - \hat{u}_n$) with a set of thresholds to produce a decided symbol ($d_n$) representative of the useful data ($x_n$) in the sample ($s_n$); and
subtracting the decided symbol ($d_n$) from the sample ($s_n$) to produce the actual noise sample ($u_n$).

9. A device, comprising:
a linear noise predictor configured to determine an amount of predicted noise ($\hat{u}_n$) in a sample ($s_n$) of digital data using predictor coefficients, wherein $c_k^n$ are predictor coefficients of the linear noise predictor at a time cycle n and wherein the sample ($s_n$) comprises useful data ($x_n$) and an actual noise sample ($u_n$); and
an adaptation circuit configured to calculate predictor coefficients ($c_k^{n+1}$) of the linear noise predictor for a future time cycle n+1 according to:

$$\begin{pmatrix} c_1^{n+1} \\ c_2^{n+1} \\ \vdots \\ c_M^{n+1} \end{pmatrix} = \begin{pmatrix} c_1^n \\ c_2^n \\ \vdots \\ c_M^n \end{pmatrix} + \Delta \times (u_n - \hat{u}_n)^* \begin{pmatrix} u_{n-1} \\ u_{n-2} \\ \vdots \\ u_{n-M} \end{pmatrix}$$

where $\Delta$ is an adaptation step size, and
$u_{n-1}, \ldots, u_{n-M}$ are actual noise samples at time cycles n−1, ..., n−M.

10. The device of claim 9, further comprising:
a first subtractor configured to subtract the predicted amount of noise ($\hat{u}_n$) from the sample ($s_n$) of the digital data to produce subtracted data ($s_n - \hat{u}_n$).

11. The device of claim 10, further comprising:
a decision circuit configured to compare the subtracted data ($s_n - \hat{u}_n$) with a set of predetermined thresholds to produce a decided symbol ($d_n$) representative of the useful data ($x_n$) in the sample ($s_n$).

12. The device of claim 11, further comprising:
a second subtractor configured to subtract the decided symbol ($d_n$) from the sample ($s_n$) to produce the actual noise sample ($u_n$).

13. The device of claim 12, further comprising:
a storage unit configured to receive and store past actual noise samples ($u_{n-i}$) from the second subtractor, where i designates past time cycles.

14. The device of claim 9, wherein the adaptation circuit is further configured to minimize the mean square error ($|\hat{u}_n - u_n|^2$) of the actual noise sample ($u_n$) subtracted from the predicted noise ($\hat{u}_n$) when determining the predictor coefficients of the linear noise predictor.

15. The device of claim 9, wherein the linear noise predictor determines the amount of predicted noise $\hat{u}_n$ according to:

$$\hat{u}_n = \sum_{k=1}^{M} c_k^{n*} u_{n-k}.$$

16. A device, comprising:

a linear noise predictor configured to determine an amount of predicted noise ($\hat{u}_n$) in a sample ($s_n$) of digital data using predictor coefficients, wherein $c_k^n$ are predictor coefficients of the linear noise predictor at a time cycle n and wherein the sample ($s_n$) comprises useful data ($x_n$) and an actual noise sample ($u_n$); and an adaptation circuit configured to calculate predictor coefficients $c_k^{n+1}$ of the linear noise predictor for time cycle n+1 according to:

$$\begin{pmatrix} c_1^{n+1} \\ c_2^{n+1} \\ \vdots \\ c_M^{n+1} \end{pmatrix} = (1 - \mu \times \Delta) \begin{pmatrix} c_1^n \\ c_2^n \\ \vdots \\ c_M^n \end{pmatrix} + \Delta \times (u_n - \hat{u}_n)^* \begin{pmatrix} u_{n-1} \\ u_{n-2} \\ \vdots \\ u_{n-M} \end{pmatrix}$$

where $\Delta$ is an adaptation step size, $\mu$ is a tap leakage constant, and $u_{n-1}, \ldots, u_{n-M}$ are actual noise samples at time cycles n−1, ..., n−M.

17. The device of claim 16, further comprising:

a first subtractor configured to subtract the predicted amount of noise ($\hat{u}_n$) from the sample ($s_n$) of the digital data to produce subtracted data ($s_n - \hat{u}_n$).

18. The device of claim 17, further comprising:

a decision circuit configured to compare the subtracted data ($s_n - \hat{u}_n$) with a set of predetermined thresholds to produce a decided symbol ($d_n$) representative of the useful data ($x_n$) in the sample ($s_n$).

19. The device of claim 18, further comprising:

a second subtractor configured to subtract the decided symbol ($d_n$) from the sample ($s_n$) to produce the actual noise sample ($u_n$).

20. The device of claim 19, further comprising:

a storage unit configured to receive and store past actual noise samples ($u_{n-i}$) from the second subtractor, where i designates past time cycles.

21. The device of claim 16, wherein the adaptation circuit is further configured to minimize the mean square error($|\hat{u}_n - u_n|^2$) of the actual noise sample ($u_n$) subtracted from the predicted noise ($\hat{u}_n$) when determining the predictor coefficients of the linear noise predictor.

22. The device of claim 16, wherein the linear noise predictor determines the amount of predicted noise $\hat{u}_n$ according to:

$$\hat{u}_n = \sum_{k=1}^{M} c_k^{n*} u_{n-k}.$$

* * * * *